Nov. 19, 1957 W. C. AMISON 2,813,546
QUICK RELEASE VALVE ACTUATOR
Filed March 11, 1955
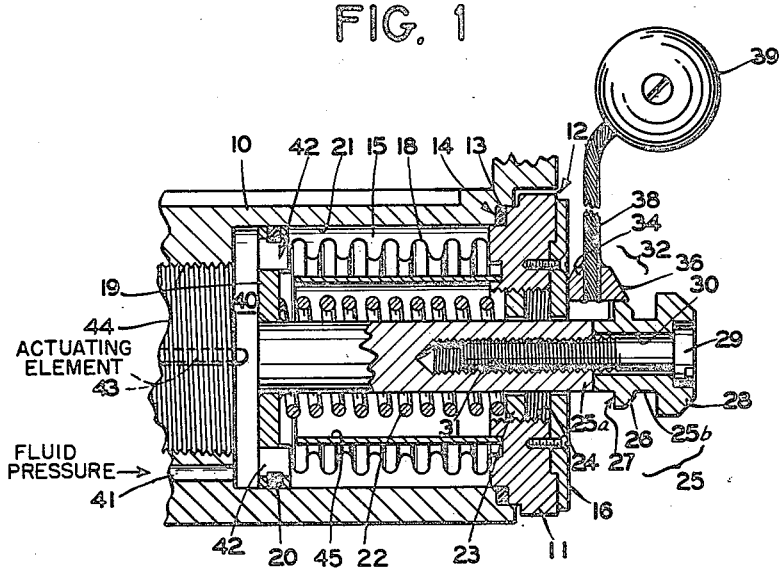
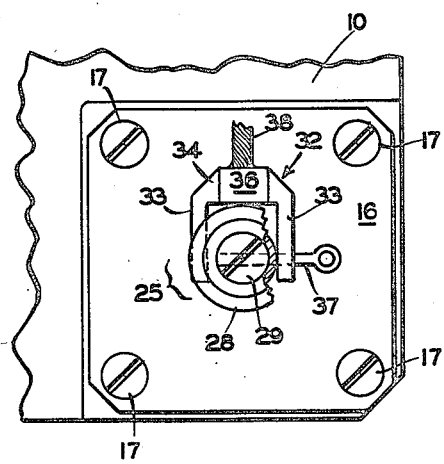
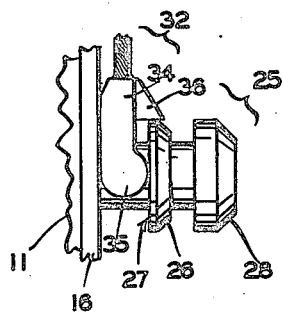
INVENTOR.
WILLARD C. AMISON
BY
ATTORNEY

United States Patent Office 2,813,546
Patented Nov. 19, 1957

2,813,546

QUICK RELEASE VALVE ACTUATOR

Willard C. Amison, Paramus, N. J., assignor to Bendix Aviation Corporation, Teterboro, N. J., a corporation of Delaware Application March 11, 1955, Serial No. 493,726

6 Claims. (Cl. 137—790)

This invention relates to valves of the type used in oxygen regulators and other kinds of oxygen supply apparatus, and is especially directed to manually operable arrangements for rapid actuation of such valves. It is especially adapted for use with bail-out regulators forming part of an oxygen supply system carried by aviators who bail out at high altitudes.

An object of the invention is to provide a normally locked operating device for an oxygen valve or other apparatus that can be readily, rapidly and reliably released. A related object is to provide a release of this type that is operable by a pull cord.

Another object is to provide a release of this kind that can be readily reset after use. A further object is to provide release elements that can be located in different positions to suit different types of mounting and different directions of possible operation by the user. A specific purpose is to provide a retractable release device that may be withdrawn from any angle. A further object is to produce an arrangement in which substantially the same force is required to operate the release in any position.

A purpose of the invention is to combine a manual release with an automatic pressure-responsive release, and more specifically to combine a bellows-actuated operating arrangement normally held in inoperative position with a manual release thereof.

The foregoing and other objects, purposes and advantages of the invention will appear more fully hereinafter from consideration of the detailed description which follows, in conjunction with the accompanying drawing wherein one embodiment of the invention is illustrated. It is to be expressly understood, however, that the drawing is for the purposes of illustration and description and is not to be construed as defining the limits of the invention.

In the drawings:

Fig. 1 is a longitudinal central section through an embodiment of the invention;

Fig. 2 is an end view thereof, with parts broken away; and

Fig. 3 is a fragmentary side view of the release device.

The illustrated embodiment comprises a body 10, normally a part of an oxygen regulator body. End block 11 fits a recess 12 in body 10, and bears against a sealing ring 13 on shoulder 14 at the end of cylindrical chamber 15 in the body. Cover plate 16 attached to block 11 is mounted on body 10, as by screws 17, arranged to press block 11 against ring 13 to assure a tight seal.

A bellows 18 in chamber 15 is soldered at one end to block 11 and at the other end to slide plate 19, marginally recessed to accommodate an O ring 20 bearing against the wall 21 of chamber 15 to provide a sliding bearing. A coil compression spring 22 bears against plate 19 and a stop plate 23 threaded into a central bore 24 in end block 11 to provide spring pressure adjustment. A stop cylinder 45 attached at one end to block 11 and extending between spring 22 and bellows 18 to a point adjacent to slide plate 19 may be provided to limit the movement of the latter plate.

Stem 25 is fixed centrally to plate 19, as by soldering it in a bore in said plate, and extends with a loose sliding fit through openings in stop plate 23 and cover plate 16.

The unit is locked, or set, by retracting the stem 25 against the pressure of spring 22 and holding the stem and plate 19 in retracted position. For this purpose the outer portion of stem 25 is provided with an annular locking flange 26 having an inner face 27 parallel to and spaced from the outer face of cover plate 16. Stem 25 may also include a setting flange 28 at its outer end, spaced from flange 26, arranged for engagement by a forked lever setting tool by which the stem may be retracted. Stem 25 may also be provided with a setting arrangement employing a screw, as shown. For this purpose the stem 25 is formed in two sections 25a and 25b, with setting screw 29 countersunk in the end of stem 25, passing slidably through an axial bore 30 in outer stem section 25b and threaded into a registering axial bore 31 in the inner section 25a.

The structure thus far described is an actuating unit, operating to actuate an associated device by movement to the left, as seen in Fig. 1, under the influence of either spring 22, bellows 18 when subjected to differing internal and external pressures or both. The structure is associated with an instrumentality that is operated by contact with plate 19, or the end of stem 25, during such movement, or during the reverse movement caused by compression of bellows 18.

Means is provided for locking said actuating unit against operative movement when its operation is not desired. This is accomplished in general by providing a retractable locking element held between cover plate 16 and an abutment on stem 25, such as flange 26, thereby maintaining the stem 25 and plate 19 in inactive position. In the form illustrated the locking element is in the form of a fork 32 having parallel side arms 33 fitting between face 27 of locking flange 26 and the registering face portion of cover plate 16, which constitutes a cooperating abutment on the body, said arms being connected at one end by integral cross-bar 34. Arms 33 fit against or close to opposite sides of stem 25, and advantageously include enlarged end sections 35, advantageously shaped to provide projecting portions engaging flange face 27 in transaxial alignment, portions of said arms between end sections 35 and cross-bar 34 being narrower than the space between the arm-engaging elements 26 and 16, providing a clearance between said portions and elements. This clearance is advantageously located at one side only of each arm, the illustrated embodiment having the clearance at the outer side adjacent to flange face 27.

The outer end sections 35 are likewise shaped to provide converging faces at the arm ends to facilitate insertion between flange face 27 and the face of cover plate 16. This may be conveniently provided by forming the projecting and end portions of sections 35 as arcs of the same circle tangent to the lower faces of arms 33 which are flush with the face of plate 16 in locked position.

The cross-bar 34 is provided with a projecting stop 36 which contacts the edge of locking flange 26 when fork 32 is in locking position, assuring the location of fork end sections 35 in transverse alignment with the axis of stem 25. The fork 32 may be fixed in locked position to prevent accidental or undesirable withdrawal of the fork, as by locking pin 37 extending through registering bores in arm 33 and stem 25.

Suitable means is provided for withdrawing fork 32 and releasing stem 25 and the associated parts of the actuating unit, either manually or otherwise. In the form illustrated a flexible metal cable 38 is passed through and fixed as by soldering to the cross-bar 34, and may be connected either to a fixture, to actuating means or to a ball handle 39 as shown.

In operation, when use of the apparatus to which the actuating unit is connected is anticipated, locking pin 37 is withdrawn and if necessary fork 32 is shifted around stem 25 to the angle at which withdrawal will be most convenient and effective. When the time for actuation arrives, fork 32 is withdrawn completely from engagement with locking flange 26, which may be accomplished by manual pull on ball handle 39 or by the pull of an abutment on an aircraft if the oxygen system is attached to a pilot in a seat that is being ejected. With the disclosed construction of fork 32, the pull required to withdraw it will be the same from any angle; and the curved enlarged end sections 35 of arms 33 will facilitate smooth withdrawal movement of fork 32 without material retraction of stem 25, even if the pull is exerted lengthwise of said stem.

Upon the withdrawal of fork 32, plate 19 will pass under the control of bellows 18 and spring 22. When fork 32 is withdrawn, spring 22 will shift plate 19 into engagement with the actuating element. In the embodiment illustrated, the unit actuates a valve of the type disclosed in the pending application of Bradford Holmes for Balanced Valve Means, Serial No. 293,523, filed June 14, 1952. The valve 44 is threaded into the body 10 to form a pressure chamber 40 between the valve and end plate 19. This chamber 40 communicates with chamber 15 through apertures 42 in plate 19. Said valve is actuated, more specifically, is opened by means of an actuating element comprising a sliding pin 43 extending through the center of the valve into chamber 40. When only a valve opening operation is required, the travel of plate 19 and the end of stem 25, forming together an actuating member, under the pressure of spring 22 will move pin 43 endwise, opening the valve, and the valve will remain open until pin 43 is reset. In this operation, contemplated in the case where the pressure of fluid applied at opening 41 is approximately equal to the air pressure within the bellows, bellows 18 will serve as a seal between chamber 40 and the outer air to prevent mixture of said fluid and the air.

However, the arrangement is adapted to operate also as a pressure regulating unit. In this type of operation when the oxygen released by the opening of valve 44 fills chambers 40 and 15 through port 41; and when the pressure rises to a predetermined value, it will cause bellows 18 to contract, releasing pin 43 and closing the valve. In this manner uniform pressure is maintained in the valve outlet. It is understood that the relatively loose connections between stem 25 and the guide openings in plates 23 and 16 serve to maintain atmospheric pressure within bellows 18.

When it is desired to inactivate the unit by retracting stem 25 and plate 19 against the pressure of spring 22, this may be accomplished by mechanical pressure against the setting flange 20, a lever having an end fitting under the latter flange having been found useful. When the stem 25 is sufficiently retracted, locking fork 32 may be slipped under locking flange 26 until the stop 36 strikes flange 26, the curved end sections 35 facilitating the insertion if the latter flange is not fully retracted. If the apparatus is not to be used in a reasonable period, the fork 32 will be locked by locating it with the bores in arm 33 and stem 25 in register, and inserting locking pin 37.

Stem 25 and plate 19 may also be retracted by backing off screw 29, allowing the outer section 25b of the stem to be lifted until flange 26 is sufficiently spaced from cover plate 16 to permit the insertion of fork 32 in locking position. By thereafter screwing in the locking screw 29 the lower section 25a of stem 25 and the attached slide plate 19 will be retracted until the two sections of said stem are brought into abutting position.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art. In particular it is pointed out that while the invention has particular and unexpected advantages in controlling the supply of oxygen, either gradually through a valve or abruptly in case of bail-out or the like, it may be employed as a tripping or triggering device for apparatus of different types in which either sudden or gradual actuation may be desirable. Also, while the specific embodiment illustrated and described includes an actuating member which when released is operated by the combined action of a spring and a bellows, the invention is not limited to this type of construction.

I claim:

1. An actuating unit for control valves and the like operated by movement of an actuating element, comprising a body, an actuating member mounted on the body for movement to and from actuating position in operative engagement with said element, means biasing the member toward actuating position, and means that is rapidly releasable manually for releasably locking said member out of actuating position, comprising a fixed member carried by the body and having a flat outer face, a stem attached to and moving with the actuating member and passing through the fixed member and face, a locking abutment on the stem beyond said face, and a removable locking member interposed between and engaged at opposite sides by said face and abutment in locking position, said locking member comprising two arms located on opposite sides of the stem and each engaged by the abutment and face, registering ends of said arms being connected to each other at one side of the stem.

2. An actuating unit as claimed in claim 1, including a stop member fixed to said arms at the connected ends thereof and contacting said abutment in locking position.

3. An actuating unit as claimed in claim 1 in which each arm is narrower than the distance between said abutment and face, except at an abutment contacting end section in transverse alignment with the axis of said abutment.

4. An actuating unit as claimed in claim 1, including an elongated flexible locking member removal element attached at one end to said arms at their connected ends.

5. An actuating unit for control valves and the like operated by movement of an actuating element, comprising a body, an actuating member mounted on the body for movement to and from actuating position in operative engagement with said element, means for biasing the member toward actuating position, comprising a bellows responsive to differentials in the pressures within and outside of the bellows, operative at a predetermined pressure to place said member in actuating position, and means for releasably locking said member out of actuating position, including a retractable locking member.

6. An actuating unit as claimed in claim 5 in which the biasing means includes a spring.

References Cited in the file of this patent

UNITED STATES PATENTS

| 56,500 | Kimball et al. | July 17, 1866 |
| 1,724,063 | Anderson | Aug. 13, 1929 |
| 2,008,198 | Beggs | July 16, 1935 |
| 2,544,991 | Holmes | Mar. 13, 1951 |

FOREIGN PATENTS

| 601,718 | Great Britain | May 11, 1948 |